Nov. 23, 1954  W. A. LEBUS  2,695,161
AUTOMOBILE RADIATOR FILLER CAP WITH PRESSURE RELIEF MEANS
Filed June 17, 1949  2 Sheets-Sheet 1
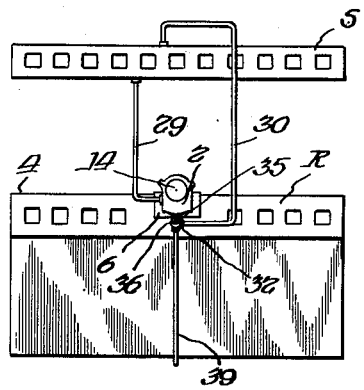
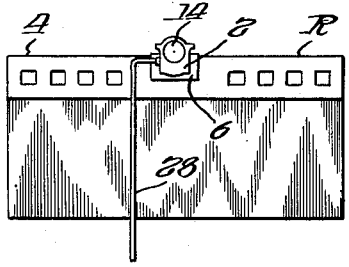
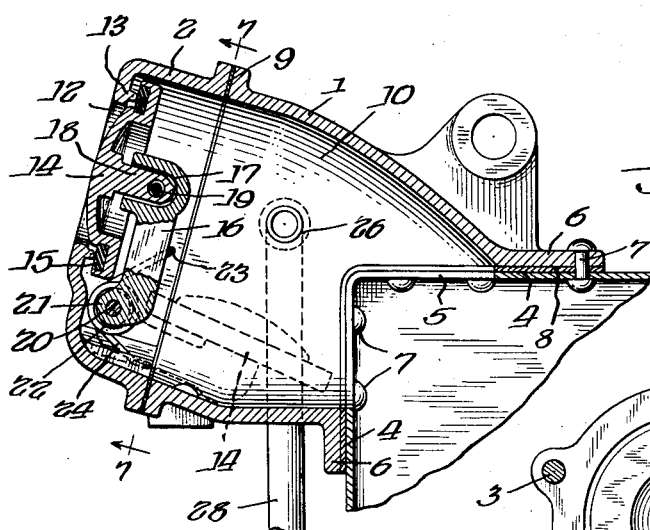
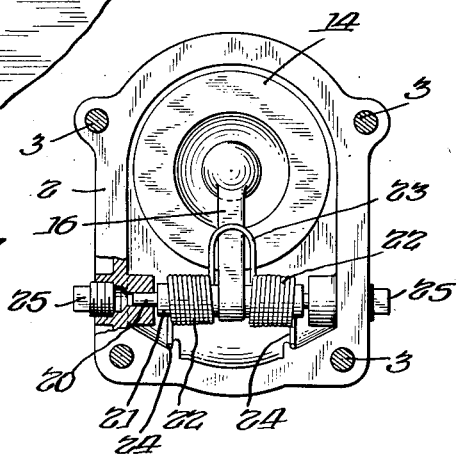
Inventor.
William A. Lebus.
By Hill & Hill
Attys.

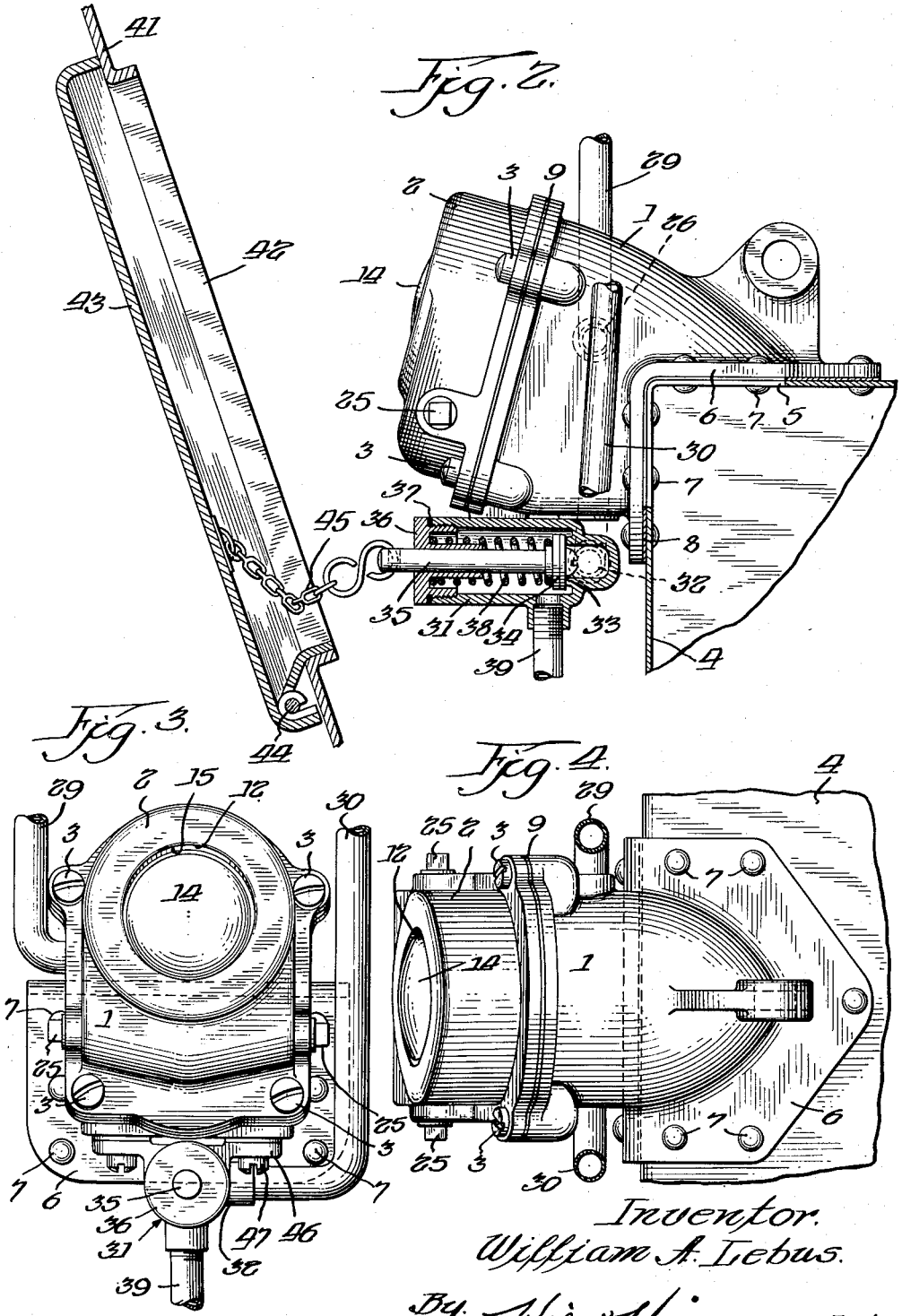

United States Patent Office 2,695,161
Patented Nov. 23, 1954

2,695,161

AUTOMOBILE RADIATOR FILLER CAP WITH PRESSURE RELIEF MEANS

William A. Lebus, Chicago, Ill., assignor to The Protectoseal Company, Chicago, Ill., a corporation of Illinois Application June 17, 1949, Serial No. 99,635

6 Claims. (Cl. 257—125)

My invention relates generally to filler caps for fluid containers, and more particularly for fluid cooling systems, such as, for example, cooling systems for buses, automobiles, trucks or the like; its use, however, not being limited to such systems or vehicles as it may be employed as a filler opening cap for any fluid container.

The invention has among its objects the production of a device of the kind described which is simple, efficient, convenient and comparatively inexpensive.

It has among its further objects the production of a filler cap of the kind described having a valve for normally closing and sealing the inlet or filler opening of a tank or receptacle, which valve may be conveniently opened by inserting a hose nozzle or container spout and pushing inwardly on the valve and upon withdrawing the nozzle will automatically close and seal the opening.

The invention also has among its objects the production of a filler cap of the kind described adapted for use in closed pressure systems as well as for use in open systems, that is, systems open to atmospheric pressure. The cap is especially adapted for, and efficient on vehicle cooling and water systems whether on passenger automobiles, trucks, buses, motor boats, or the like, particularly where the cooling systems are closed or operated under pressure, means being provided for automatically relieving and preventing the building up of pressure greater than desired. It is also a safety device as the pressure may be manually relieved prior to the insertion of the hose nozzle without the sudden, uncontrolled discharge or emission of hot water or steam which might scald or burn or otherwise injure the attendant. The use of the filler cap, however, is not limited to pressure systems, as it may be employed on open systems or in connection with containers or receptacles in the supplying of oil, fuel, or other liquids. It will be noted there are no parts to be removed and misplaced.

Many other objects, uses and advantages will be obvious to those skilled in the art from the disclosures herein set forth.

In the drawings, wherein like reference characters represent like or corresponding parts;

Fig. 1 is a diagrammatic illustration showing a possible application of my device to a radiator having a surge tank in a closed or pressure circulating system;

Fig. 2 is a side elevation of my improved cap with the relief valve for a closed system shown in section, and a simple door construction which may be, in some instances, associated with the cap for relief;

Fig. 3 is a front elevation of the cap and relief valve;

Fig. 4 is a top elevation of the cap;

Fig. 5 is a diagrammatic illustration of the device applied to a system open to the atmosphere, in which a surge tank is not employed;

Fig. 6 is a longitudinal sectional view taken substantially on the center line of the device showing its application to an open system; and Fig. 7 is a sectional view taken substantially on line 7—7 of Fig. 6 with parts eliminated.

Referring now to the drawings in which I have shown diagrammatically in Fig. 1 the application of the cap to a closed pressure water or cooling system, as for instance, on a truck or bus. In Fig. 5 a simplified form is shown without the pressure relief valve as it would be employed in the open pressure system. The filler spout consists of a tubular housing which, in the particular embodiment shown, consists of the parts 1 and 2 secured together by screws 3, or their equivalent for the purpose. The housing is shown mounted on a tank 4 at the opening 5 in the tank, the cap housing being provided with a flange 6, which is secured to the tank by rivets 7, or the equivalent. In order to seal the same, a gasket or packing 8 is shown arranged between the tank wall 4 and the flange 6, and a gasket 9 is likewise preferably arranged between the parts 1 and 2, as clearly shown in Figs. 3 and 6. The housing parts valve 14 and associated parts are the same in the closed and open systems. The chamber 10, shown most clearly in Fig. 6, in the housing parts 1 and 2, is provided with an inlet port 12 in the part 2. Referring to Fig. 6, part 2 is provided with a valve seat 13 surrounding the inlet opening 12 for cooperation with the valve member 14, which is provided with a suitable ring seal 15 of the desired material arranged in the form of an insert. Valve 14 is carried by a swinging arm 16 having a recess 17 into which the stem 18 on valve 14 seats, the valve and arm being suitably secured together by a pin 19 or the equivalent. There is some slight play between the arm 16 and valve 14 so the valve may seat properly on the valve seat 13 and afford a tight sealing. As illustrated in Fig. 6, the arm 16 is provided with a hub 21 carried by a pintle or shaft 20. The valve 14 is normally maintained in the closed position shown in Fig. 6 by a double torsion spring 22 provided with a loop 23 engaging the arm 16, the free ends 24 of the spring at either side engaging with the part 2 of the housing, as most clearly shown in Fig. 7. In Fig. 6 I have illustrated by the dotted lines how the valve swings inwardly when a hose nozzle, or the like, is pushed into the housing, permitting the filling of the tank or system without requiring the necessity of removing a loose detachable cap, as is ordinarily used in most installations. The shaft or pintle 20 is maintained in position by the studs or pipe plugs 25 shown in Fig. 7, which also seal the housing member 2.

The housing is provided with an opening 26, which may be threaded or otherwise arranged for attachment on a conduit or duct. When the device is used on a tank R in an open system, as shown in Fig. 5, the overflow pipe indicated at 28 in Fig. 5 communicates with the interior of the housing at the opening 26.

When the cap is used in connection with the closed system, as diagrammatically shown in Fig. 1 in which R represents a radiator upper tank and S a surge tank, the surge tank S is connected with the opening 26 by a pipe or conduit 29. The surge tank is further connected by a pipe 30 with a relief valve housing 31 (see Fig. 2) provided with an inlet port 32 communicating with the pipe 30. The housing 31, as shown, may be provided with ears 46 which are secured to housing 1 by screws 47 or the equivalents. Arranged within the housing 31 is a relief valve 34 movable to seat on valve seat 33. The valve is adjustably mounted on a stem 35 which projects to the exterior of the housing at the end 36, 37 being a gasket arranged between 31 and 36. Arranged on the valve stem 35 and bearing against the cap 36 at the end and the valve 34 is a spring 38 which tends to normally maintain the valve 34 in its closed position. A discharge pipe 39 communicates with the interior of the housing 31 and extends to overflow or to atmosphere.

I have illustrated in Fig. 2 the filler cap arranged on the tank 4 adjacent to the wall 41, for example, the front end or side wall of a bus. In the wall 41 is an opening 42 which is normally covered by a small door 43 pivoted at 44 to the wall 41 and normally maintained shut by any suitable means, as, for example, a spring (not shown) at the hinge pin 44 or by means of a latch (not shown). In this instance, the valve stem 35 is connected by means of a chain or cable 45 to the door 43 so that when the door is opened it exposes the filler cap on the closed or pressure system. This will also operate the relief valve 34 prior to the time that the hose nozzle is inserted in the filling opening to the cap relieving the tank pressure.

In the open system without pressure, the device is substantially as shown in Figs. 5 and 6 without the relief valve. By pushing the hose nozzle in through the opening 12, the valve is opened by the nozzle and the tank may be filled without otherwise removing any parts. Obviously a relief valve may be employed if desired.

In the closed system illustrated diagrammatically in

Fig. 1 and shown with the relief valve in Figs. 2, 3 and 4, the connections are substantially as shown in Fig. 1. Normally the door 43 is closed. This being the pressure system, the valve 14 and the relief valve 34 are in closed position. However, should the pressure in the system exceed a predetermined amount, depending upon the adjustment of the spring 38, the valve 34 would also relieve the excessive pressure. Referring to Fig. 1, the surge tank is shown mounted directly above the radiator to take the overflow of the water of the radiator proper due to expansion. The liquid rises to the surge tank via the tube or piping 29. In case the water cools in the radiator, the water will return to the radiator through the same tube. However, should the radiator water boil and the steam seek an outlet to the atmosphere, that steam travels up through the liquid riser tube, through the surge tank and down through pipe 30 into the pressure relief valve housing 31. If the pressure exceeds the spring setting, it will open the valve and pass down through the overflow pipe 39.

It will be obvious from the preceding that my improved radiator cap is adapted for any open system or, with the addition of the pressure relief valve and suitable piping, is adapted for any closed pressure system.

Having thus described my invention it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. A closed pressure system comprising in combination, a fluid container and a surge tank associated therewith located to the rear of a wall having an opening closable by a door, a filler cap for said container accessible through said opening upon opening said door and including a housing communicating with the container and provided with an inlet, a valve seat surrounding the inlet, an inwardly movable valve for filling the container when the valve is opened and for normally sealing said inlet when the valve is closed, spring means for normally maintaining said valve on said seat in its closed position, a conduit communicating with the interior of the housing and extending to the surge tank, a pressure relief valve means including a valve and a housing therefor operatively mounted on the filler cap and detachably affixed thereto, said pressure relief valve means operatively connected to the aforesaid door and adapted to relieve the pressure in the closed pressure system to fill the fluid container when under pressure, a conduit extending from the surge tank to the relief valve means, and said relief valve housing provided with an overflow conduit extending therefrom, whereby upon opening the door to display the filler cap, the pressure in the surge tank is relieved and also pressure in the system is relieved prior to the opening of the inwardly movable valve for filling the fluid container.

2. A closed pressure system comprising in combination, a fluid container, a surge tank associated therewith, a filler cap for said container consisting of a housing communicating with the container and provided with an inlet, a valve seat surrounding the inlet, an inwardly movable valve within the housing for filling the container when the valve is opened and for normally sealing said inlet when the valve is closed, spring means for normally maintaining said valve on said seat in its closed position, a conduit communicating with the interior of the housing and extending to the surge tank, a pressure relief valve means adapted to relieve pressure within the surge tank and including a valve and a housing therefor associated with the filler cap and adapted for manual manipulation to relieve the pressure in the closed system to fill the container, a conduit extending from the surge tank to the pressure relief valve means, said relief valve housing also including an overflow conduit extending therefrom, said pressure relief valve means interposed between the inlet and the overflow conduit, spring biased means for normally maintaining said valve of the pressure relief valve means closed, and manually operated means operatively connected to the valve of the pressure relief valve means for manually opening said valve to relieve pressure in the system prior to opening the inwardly movable valve to fill the container.

3. A closed pressure system comprising a fluid container and a surge tank associated therewith a wall provided with an opening closable by a door and mounted contiguous to the fluid container, a filler cap for said container accessible through said opening upon opening of said door and including a housing provided with an inlet, a valve seat surrounding the inlet, an inwardly movable valve for normally sealing said inlet in its closed position, resilient means for normally maintaining said inwardly movable valve on said seat in its closed position, a conduit communicating with the interior of the housing and extending to the surge tank, a pressure relief valve means including a valve and a housing therefor associated with the filler cap, a conduit extending from the surge tank to the relief valve, said relief valve housing also including an overflow conduit extending therefrom, said pressure relief valve interposed between the inlet and the overflow conduit, means for normally maintaining said pressure relief valve closed, and means for opening said pressure relief valve to relieve pressure in the system, including the aforesaid door pivotally supported and disposed in front of the filler cap, and means for connecting the door to the relief valve means, whereby opening the door to display the filler cap with the inwardly movable valve normally closed automatically relieves the pressure in the system prior to the opening of the inwardly movable valve at the inlet to the cap housing.

4. A closed pressure system comprising a radiator, a surge tank, a normally closed spring biased pressure relief valve means, said radiator including a filler cap, conduit means operatively connecting the filler cap with the surge tank, and conduit means operatively connecting the surge tank to the pressure relief valve means, said filler cap comprising, in combination, a housing having an inlet and an outlet, and provided with a valve seat in the interior of the housing surrounding said inlet, a valve arranged within the housing and inwardly movable therein to cooperate with said seat, pivoted arm means for operatively supporting said valve within the housing and spring means for yieldingly permitting said valve to open under an operator applied pressure to said valve and maintaining said valve on said seat upon removal of said pressure, and the normally closed spring biased pressure relief valve means operatively connected in the system including manually operable means, and said relief valve means operatively connected to the radiator of the system through said aforementioned conduit means and surge tank, whereby the pressure relief valve means is adapted to vent the system, either upon a movement of an operator to open the valve, or excess pressure within the system.

5. The combination with a filling device and a closed pressure system including a container for a liquid under pressure, of a wall provided with an opening contiguous to the filling device of the container for accessibility to the filling device through the opening, said filling device comprising a housing provided with means for securing the filling device on the container at an opening thereinto and having an inlet and outlet and provided with a valve seat at the interior of the house at the inlet, a valve member disposed within the housing and normally biased to its closed position, an arm hinged to the housing at the interior thereof, said valve member adjustably carried at the free end of said arm, spring means within the housing cooperating with said arm for normally yieldingly maintaining said valve on its seat in its closed position, a door for the opening of the wall contiguous to the filling device disposed forward thereof, and a normally closed pressure relief valve operatively connected to the door and in the system for controlling the pressure in the system, whereby upon opening of the door, the relief valve is actuated thereby venting the system with the valve member in its closed position prior to the opening of the valve member.

6. A closed pressure system comprising in combination, a fluid container located to the rear of a wall having an opening closable by a door, a filler cap for said container accessible through said opening upon opening said door and including a housing communicating with the container and provided with an inlet, a valve seat surrounding the inlet, and an inwardly movable valve for filling the container when the valve is opened and for normally sealing said inlet when the valve is closed, spring means for normally maintaining said valve on said seat in its closed position, a pressure relief valve means including a valve and a housing therefor operatively connected to the fluid container, said pressure relief valve means operatively connected to the aforesaid door, and said relief valve housing provided with an overflow conduit extending therefrom, whereby upon opening the door to display the filler cap, the pressure in the system is relieved prior to the opening of the inwardly movable valve.

References Cited in the file of this patent

UNITED STATES PATENTS

| Number | Name | Date |
|---|---|---|
| 454,106 | Barker | June 16, 1891 |
| 863,128 | Aebi | Aug. 13, 1907 |
| 1,257,229 | Hester | Feb. 19, 1918 |
| 1,620,701 | Teich | Mar. 15, 1927 |
| 1,712,877 | Ehlers | May 14, 1929 |
| 1,761,396 | Karmazin | June 3, 1930 |
| 1,827,913 | Rymal | Oct. 20, 1931 |
| 2,043,368 | Boldt | June 9, 1936 |
| 2,147,699 | Hardiman | Feb. 21, 1939 |
| 2,181,224 | Campbell et al. | Nov. 28, 1939 |
| 2,201,314 | Illsley | May 21, 1940 |
| 2,247,509 | Lebus | July 1, 1941 |
| 2,343,145 | Heiney | Feb. 29, 1944 |
| 2,414,909 | Snyder | Jan. 28, 1947 |